(12) United States Patent
Kim et al.

(10) Patent No.: US 9,001,056 B2
(45) Date of Patent: Apr. 7, 2015

(54) OPERATING METHOD OF TERMINAL BASED ON MULTIPLE INPUTS AND PORTABLE TERMINAL SUPPORTING THE SAME

(75) Inventors: Kyung Hwa Kim, Seoul (KR); Dong Jun Shin, Seoul (KR); Ji Young Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 451 days.

(21) Appl. No.: 13/315,435

(22) Filed: Dec. 9, 2011

(65) Prior Publication Data

US 2012/0200513 A1 Aug. 9, 2012

(30) Foreign Application Priority Data

Feb. 9, 2011 (KR) .................. 10-2011-0011352

(51) Int. Cl.
*G06F 3/041* (2006.01)
*G06F 3/0488* (2013.01)
*G06F 1/16* (2006.01)

(52) U.S. Cl.
CPC .......... *G06F 3/04883* (2013.01); *G06F 1/1626* (2013.01); *G06F 2200/1637* (2013.01)

(58) Field of Classification Search
None
See application file for complete search history.

(56) References Cited

U.S. PATENT DOCUMENTS

| | | | |
|---|---|---|---|
| 2008/0174570 A1* | 7/2008 | Jobs et al. | 345/173 |
| 2009/0201246 A1* | 8/2009 | Lee et al. | 345/156 |
| 2010/0007518 A1 | 1/2010 | Kang et al. | |
| 2010/0039394 A1 | 2/2010 | Moussavi | |
| 2010/0134312 A1 | 6/2010 | Park et al. | |
| 2010/0162178 A1 | 6/2010 | Tuli | |

FOREIGN PATENT DOCUMENTS

| | | | |
|---|---|---|---|
| EP | 2 161 645 A2 | | 3/2010 |
| EP | 2161645 A2 | * | 3/2010 |
| JP | 2004-287871 A | | 10/2004 |
| JP | 2004287871 A | * | 10/2004 |
| KR | 10-2009-0093766 A | | 9/2009 |
| KR | 10-2010-0006847 A | | 1/2010 |
| KR | 10-2010-0058250 A | | 6/2010 |
| KR | 10-2011-0008940 A | | 1/2011 |

* cited by examiner

*Primary Examiner* — Grant Sitta
*Assistant Examiner* — Kirk Hermann
(74) *Attorney, Agent, or Firm* — Cha & Reiter, LLC

(57) ABSTRACT

An operating method of a terminal based on multiple inputs and a portable terminal supporting the same are disclosed. The operating method includes: receiving a sensor signal in a state that a touch-down event having at least one touch point is being maintained, generating respective distinct commands according to at least one of a number of touch points of the touch-down event, and a type and a form of the certain sensor signal, activating one of a user function or controlling an operation of a currently activated user function according to the generated commands; and controlling variation in a screen output on a display panel according to the activation or the control of the user function.

12 Claims, 13 Drawing Sheets

FIG. 4
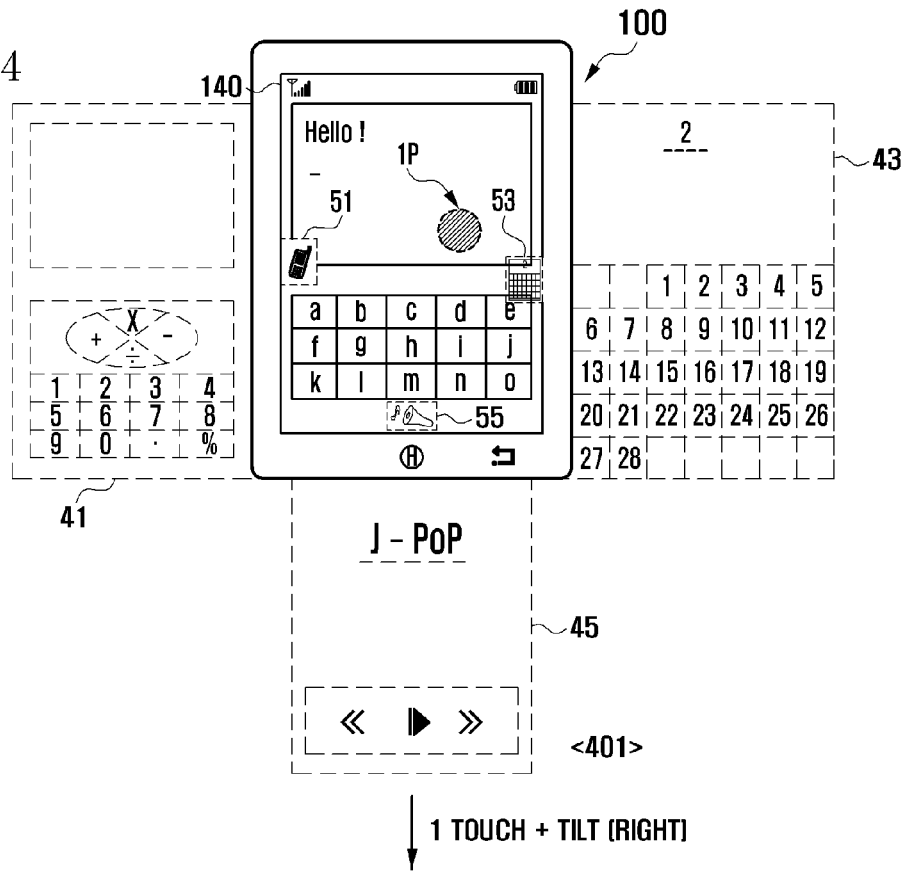
<401>
↓ 1 TOUCH + TILT (RIGHT)
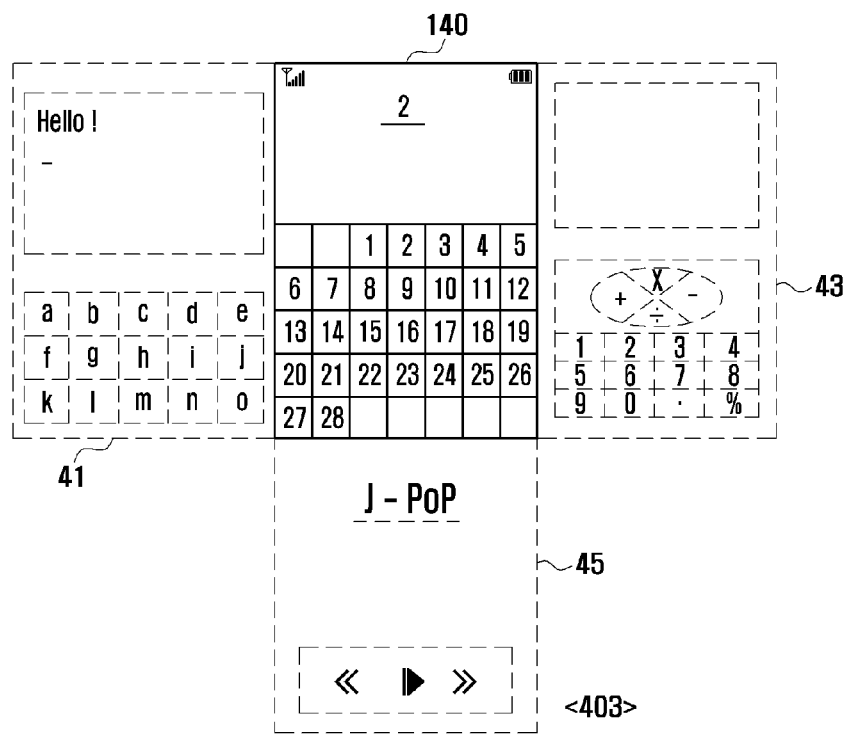
<403>

[ Captured or Zoomed ]

US 9,001,056 B2

OPERATING METHOD OF TERMINAL BASED ON MULTIPLE INPUTS AND PORTABLE TERMINAL SUPPORTING THE SAME

CLAIM OF PRIORITY

This application claims, pursuant to 35 USC 119, claims priority to, and the benefit of the earlier filing date of, that patent application filed in the Korean Intellectual Property Office, on Feb. 9, 2011 and afforded serial number 10-2011-0011352, the contents of which are incorporated by reference herein.

BACKGROUND OF THE INVENTION

1. Field of the Invention

The present invention relates to the field of portable terminals and more particularly, controlling a user function according to corresponding multiple inputs.

2. Description of the Related Art

Portable terminals have been used in a wide variety of fields, principally because of their flexibility and mobility. In particular, among portable terminals, a mobile communication terminal enabling a voice call with mobility is a very popular portable terminal that a significant number of people have used. Meanwhile, the mobile communication terminal may have various other functions other than a function for transmitting and receiving call information between speakers. For example, a conventional portable terminal may have an MP3 function corresponding to a file playback function and an image collection function corresponding to a digital camera capable of collecting images. Further, the conventional portable terminal supports a function capable of performing mobile games or arcade games.

A touch screen type portable terminal that incorporates a touch event in a manner similar to a key pad currently operates as an input signal generator. According to the touch screen and key pad applying terminals, a user may control an operation of the portable terminal. However, the input signal generation type needs a minute touch or click operation. That is, in the conventional input signal generation type, when the user cannot exactly push a certain key provided at a key pad or cannot exactly touch a touch region output on a touch screen in a certain situation, the user cannot rightly create a desired input signal. With the recent supply of a full touch screen type portable terminal, a separate key pad region does not tend to be provided. According to the trend, various input key maps are output on a full touch screen to generate an input signal. Because a display unit is used as both an input means and an output means, there are considerable limitations in generation of the input signal. Accordingly, there is a need for development of technology supporting generation of various input signals.

SUMMARY OF THE INVENTION

The present invention has been made in view of the above problems, and provides an operating method of a terminal based on multiple inputs that may collectively operate a touch event signal and a sensor signal generated from a portable terminal to support various input signal generation types and easily control and operate a user function of the portable terminal based thereon, and a portable terminals supporting the same.

In accordance with an aspect of the present invention, a portable terminal for supporting an operation based on multiple inputs includes: a touch panel generating a touch event; a motion sensor generating a sensor signal according to an operations state of the sensor; a controller activating a user function or controlling an operation of a currently activated user function according to at least one of a number of touched points of the touch-down event and a type and a form of the sensor signal generated by the motion sensor in a state that a touch-down event is being maintained; a memory storing a program for supporting the user function; and a display panel outputting a screen corresponding to the user function.

In accordance with another aspect of the present invention, an operating method of a terminal based on multiple inputs includes: receiving a sensor signal in a state that a touch-down event having at least one touch point is being maintained; generating respective distinct commands according to at least one of a number of touch points of the touch-down event, and a type and a form of the sensor signal; activating a user function or controlling an operation of a currently activated user function according to the generated commands; and controlling variations in a screen output on a display panel according to the operation of the user function.

An operating method of a terminal based on multiple inputs and a portable terminal supporting the same according to an embodiment of the present invention may generate commands for controlling a desired certain user function in various schemes or in a simple scheme, and conveniently operate the portable terminal.

BRIEF DESCRIPTION OF THE DRAWINGS

The objects, features and advantages of the present invention will be more apparent from the following detailed description in conjunction with the accompanying drawings, in which:

FIG. 4 is a view illustrating an example of a screen interface for operating a terminal based on multiple inputs according to a first embodiment of the present invention;

DETAILED DESCRIPTION OF THE INVENTION

Exemplary embodiments of the present invention are described in detail with reference to the accompanying drawings. The same reference numbers are generally used throughout the drawings to refer to the same or like parts. Detailed descriptions of well-known functions and structures incorporated herein may be omitted to avoid obscuring the subject matter of the present invention.

Figure 1:
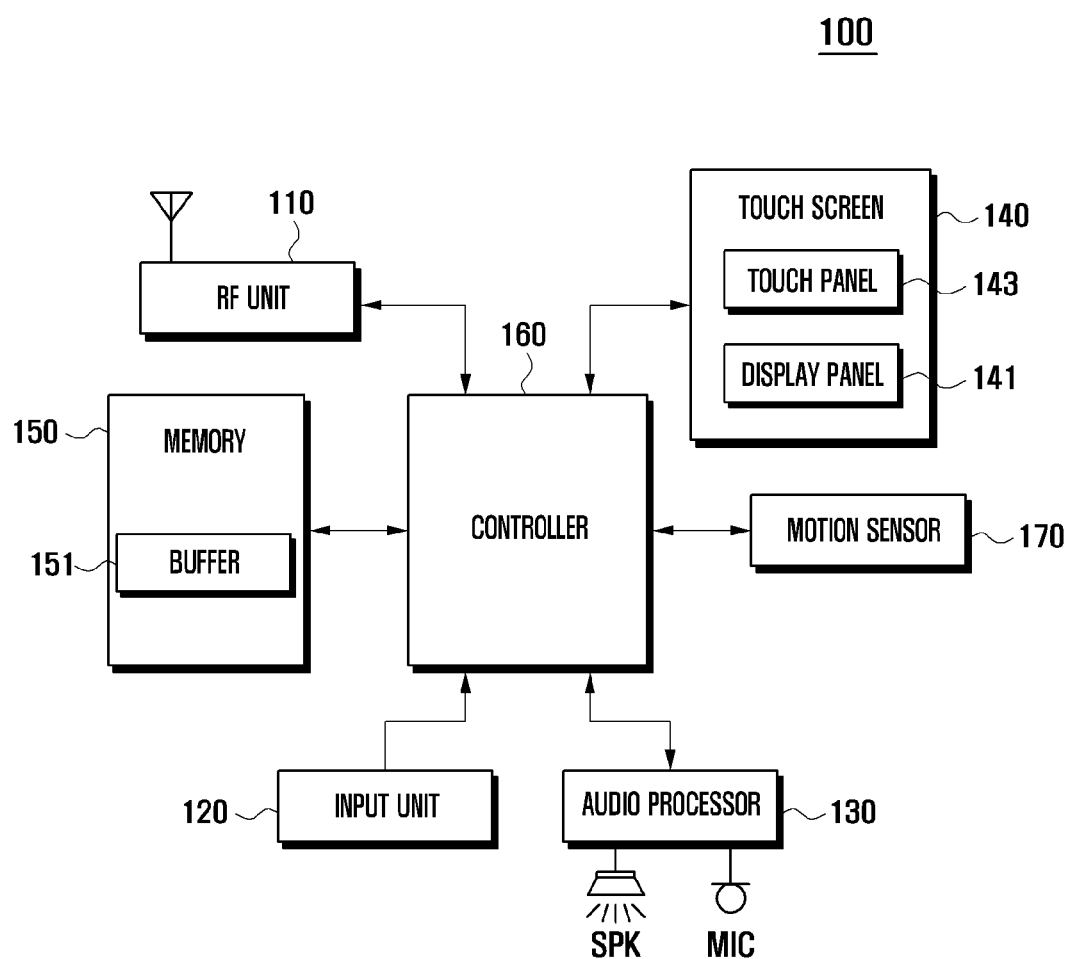
FIG. 1 is a block diagram illustrating a schematic configuration of a portable terminal according to an exemplary embodiment of the present invention.

FIG. 1 is a block diagram illustrating a schematic configuration of a portable terminal according to an exemplary embodiment of the present invention.

Referring to FIG. 1, a portable terminal 100 includes a communication (RF) unit 110, an input unit 120, an audio processor 130, a motion sensor 170, a touch screen 140, a memory 150, and a controller 160.

When a touch occurs on the screen (referred to hereinafter as a touch-down event), the portable terminal 100 of the present invention determines the number of points touched on the screen according to the touch-down event, and collectively recognizes a sensor signal of a motion sensor 170 generated in a maintained state of the touch-down event to generate a corresponding command and to control performing a function. Accordingly, the portable terminal 100 may perform a certain user function with integrally collected multi-input signals based on respective distinguished commands. Accordingly, the portable terminal 100 may generate a unique command in various operational situations of a user function that allows a user to easily control the operation through the portable terminal 100. Hereinafter, functions and roles of respective structural elements of the portable terminal 100 for operation based on multiple inputs according to the present invention will be described in detail.

The communication (RF) unit 110 supports transmission and reception of a voice signal associated with a call function and of data associated with data communication under the control of the controller 160. The communication unit 110 may include a transmitter (not shown) up-converting a frequency of a transmitted signal and amplifying the signal, a receiver (not shown) low-noise-amplifying a received signal and down-converting the signal. In particular, the communication (RF) unit 110 of the present invention may be activated or inactivated according to multi-input signals collected by a touch panel 143 and a motion sensor 170. For example, when the user performs a "shaking" operation while performing a touch-down with respect to one point to generate a single-point touch down event, the communication (RF) unit 110 may, in response to the combination of a "shaking" signal and a single-point touch down event, perform a preset function. For example, an automatic communication connection function with another portable terminal having a certain phone number may be performed in response to the combination of touch-down event and shaking. In this case, the communication (RF) unit 110 may perform different user functions according to distinctly generated commands according to a number of touched points and a type of sensor signal. For example, an image call connection with another certain portable terminal or an automatic access of a web page having a designated web address may be performed based on the touch-down event and the type of sensor signal detected.

The input unit 120 creates various input signals associated with controlling the portable terminal 100. The input unit 120 includes a plurality of input keys and function keys for receiving input of numeral or character information and for setting various functions. The function keys may include an arrow key, a side key, and a hot key set to perform a certain function. When the portable terminal 100 is provided in a full touch type input unit, the input unit 120 may be configured by only a side key, a function for inputting numerals or characters may be configured by a key map, which is output and configured on the touch screen 140. The input unit 120 may generate an input signal for performing a control operation to activate or inactivate a multiple input mode according to the number of touch points of a touch-down event, and a type and a form of a sensor signal under the control of the user according to an embodiment of the present invention. The input unit 120 may transfer the generated input signal to the controller 160. As would be recognized, the input unit may be an optional feature of the device shown in FIG. 1.

The audio processor 130 includes a speaker SPK for playing audio data transmitted and received during a call, and a microphone MIC for collecting a user's voice or other audio signals during the call. In particular, the audio processor 130 may output a guide message indicating a "multiple-input" mode according to a motion sensor 170 and a touch panel 143. (e.g., "entering multi-input mode," "exit multi-input mode"). Further, the audio processor 130 may output a guide sound or an effect sound corresponding to performing a certain command created according to multiple inputs in the "multiple-input" mode. The guide sound or the effect sound according to the multiple inputs of the audio processor 130 may be omitted under the control of the user.

The touch screen 140 outputs a screen activated according to a function of the portable terminal. The touch screen 140 is activated under the control of the controller 160 and supports a function for collecting a touch event. To do this, the touch screen 140 may include a display panel 141 and a touch panel 143.

The display panel 141 may output a booting screen, an idle screen, a menu screen, and a call screen. A flat panel display technology based on a thin film transistor such as an OLED (Organic Light Emitting Diode) or a Liquid Crystal Display (LCD) is applicable to the display panel 141. When the LCD is applicable to the display panel 141, it may include an LCD controller, a memory for storing data, and an LCD display element. In particular, the display panel 141 of the present invention may output various screens or change a form of a previously output screen according to an operation of a user function performed based on commands ("multiple-input") created according to multiple inputs. The change in the screen output on the display panel will be described in detail through the following embodiments.

The touch panel 143 is provided at an upper portion or a lower portion of the display panel 141, and creates a touch event according to a touch. The touch panel 143 may be configured by using different types of technology. For example, the touch panel 143 may be a resistive overlay type, a capacitive overlay type, or a combination thereof. In particular, the touch panel 143 creates touch-down events with respect to at least one touched point and provides location information and touch state information of the created touched points to the controller 160. The touch panel 143 may be operated separately from the motion sensor 170. Accordingly, while the motion sensor 170 is generating a certain type of a sensor signal, the touch panel 143 may create a touch event according to a user touch (e.g., a touch-down event). In particular, the touch panel 143 may scan for a touched state during successive time periods to detect variations in the touched state, thereby detecting variations in the number of release time points of the touch-down event or generated points of a touch-down. The touch event collected from the touch panel 143 may be transferred to the controller 160.

The memory 150 stores an application program necessary for a function operation, an operations program for operating the touch panel 143, and an operations program for operating respective sensor modules of the motion sensor 170 according to an embodiment of the present invention. The memory 150 includes a buffer 151 temporarily storing a touch event created from the touch panel 143 and a sensor signal input from the motion sensor 170. The memory 150 may buffer at least one of the touch event and the sensor signal using the buffer 151. The memory 150 may include a program area (not shown) and a data area (not shown).

The program area stores an operation system (OS) for booting the portable terminal 100, an application program for operating a sensor included in a motion input device, and an application program associated with other functions of the portable terminal 100. For example, the program area may include application programs for a sound playback function, and/or an image or moving image playback function. In particular, the program area of the present invention may store a multiple input support program. The "multiple-input" support program may include a routine for operating respective sensors included in the motion sensor 170, a routine for operating the touch panel 143, a routine for creating a ("multiple-input") command distinguished according to the collected touch event and sensor signal, and a control routine for controlling activation of a user function corresponding to the created command and an operation of a previously activated user function. The "multiple-input" support program may be loaded into the controller 160 according to selection of a multiple inputs mode of the portable terminal 100.

The data area stores data created according to the use of the portable terminal 100. The data area may store user data associated with the operation of various functions provided from the portable terminal 100. For example, data may be collected and stored in the data area for such operations as moving images, phone-book data, audio data, and corresponding contents, and information corresponding to the user data. In particular, the data area of the present invention may store a command table to create commands ("multiple-input") corresponding to multiple inputs. The command table may distinguish commands according to the number of touched points of a touch-down event and a type of sensor signal. The command table may further include distinct commands according to the number of touched points, a type of sensor signal, and a type of a currently activated application program. If a "multiple-input" support program is loaded into the controller 160, the command table may be referred by a corresponding "multiple-input" support program.

The motion sensor 170 includes various sensors. For example, the motion sensor 170 may include at least one of a movement sensor, a velocity sensor, an acceleration sensor, a gyro sensor, a pressure sensor, and a vibration sensor. The various sensors operate based on supplied power under the control of the controller 160, and generate a corresponding sensor signal according to the movement of the portable terminal 100 or pressure applied to the portable terminal 100. The motion sensor 170 may transfer the sensor signal created by the corresponding sensor to the controller 160. The motion sensor 170 of the present invention may include additional sensors such as a geomagnetic sensor, an optical sensor, and a photo sensor.

The controller 160 control a power supply to the portable terminal 100, activation of respective devices, and flow of signals transmitted and received between the respective devices. In particular, the controller 160 of the present invention may control the power supplied to the motion sensor 170 and the touch panel 143 according to a request for selection of a "multiple-input" mode, and perform a control operation to generate a "multiple-input" command based on the number of touched points of a touch event collected by the touch panel 143 and a sensor signal generated by the motion sensor 170. Further, the controller 160 operates a user function of the portable terminal 100 according to the generated "multiple-input" command. To do this, the controller 160 of the present invention may include a configuration as illustrated in FIG. 2.

Figure 2:
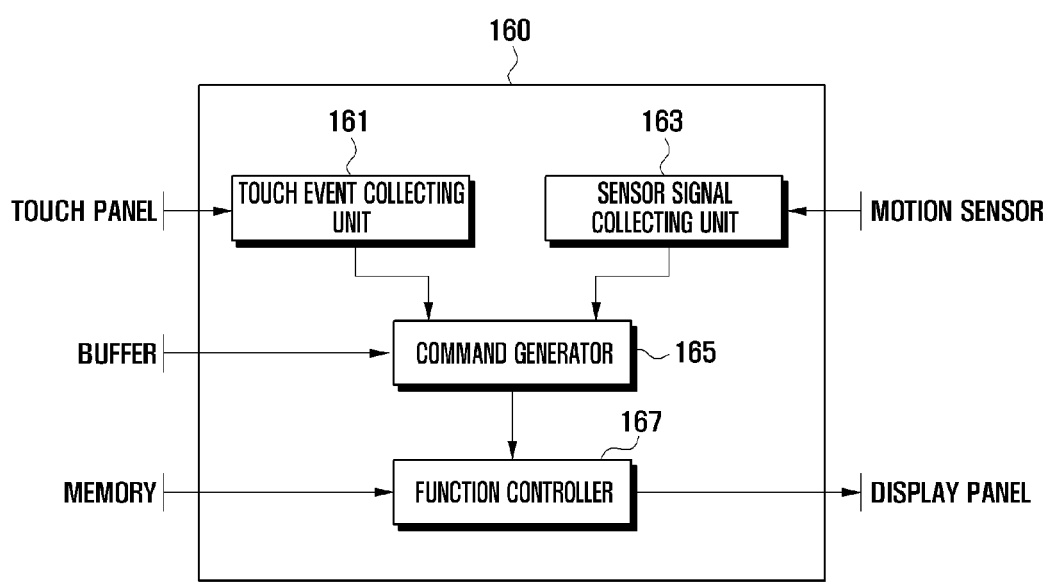
FIG. 2 is a block diagram illustrating a controller of a portable terminal according to an exemplary embodiment of the present invention in detail.

FIG. 2 is a block diagram illustrating a controller 160 of a portable terminal 100 according to an exemplary embodiment of the present invention in detail.

Referring to FIG. 2, the controller 160 of the present invention may include a touch event collecting unit 161, a sensor signal collecting unit 163, a command generator 165, and a function control unit 167.

The touch event collecting unit 161 collects touch events occurring on the touch panel. In particular, the touch event collecting unit 161 may collect information about the number of touched points of a touch-down event occurring on the touch panel 143, and transfer the collected information to the command generator 165. The touch event collecting unit 161 may further collect location information of a touched region of the touch-down event occurring on the touch panel 143, and transfer information about the number of touched points to the command generator 165 together with the location information.

The sensor signal collecting unit 163 collects various sensor signals generated from the motion sensor 170 according to an operating state of the portable terminal 100. To do this, the sensor signal collecting unit 163 may monitor various sensors included in the sensor 170 to check which sensor signal is generated. Accordingly, the sensor signal collecting unit 163 may transfer information about a type of a sensor having generating a signal and a sensor signal provided from a corresponding sensor to the command generator 165. For example, when an acceleration sensor, among sensors included in the motion sensor 170, is disposed at an inner side of a case of the portable terminal 100, the sensor signal collecting unit 163 may detect a signal generated due to "shaking" or "snap" of the portable terminal 100. In this case, the sensor signal collecting unit 163 may distinguish a shaking action from a snap action through a variation in a frequency generated due to the movement of the portable terminal 100. When an amplitude variation curve of a frequency generated due to the movement of the portable terminal 100 is fluent (contiguous) and a plurality of frequencies are generated, the sensor signal collection unit 163 may recognize it as "shaking." When the amplitude variation curve of the frequency is sharp and one frequency is generated, the sensor signal collection unit 163 may recognize it as "snap" action. The sensor signal collecting unit 163 may detect a sensor signal corresponding to a tilt of the portable terminal, for example, by a variation in a direction using a gyro sensor included in the motion sensor 170. Further, the sensor signal collecting unit 163 may monitor a vibration sensor of the motion sensor 170 to detect a signal corresponding to vibration occurring in a case due to shaking of the portable terminal 100 or an external shock applied to the portable terminal. The sensor signal collecting unit 163 may detect a sensor signal generated due to an external pressure applied to a case of the portable terminal 100 using a pressure sensor of the motion sensor 170. The sensor signal collecting unit 163 may transfer sensor signals collected from at least one sensor among the foregoing sensors to the command generator 165.

The command generator 165 generates commands corresponding to signals collected by the touch event collecting unit 161 and the sensor signal collecting unit 163, and transfers the generated commands to the function control unit 167. If touch-down events are collected from the touch event collecting unit 161, according to setting a "multiple-input" mode, the command generator 165 may control the buffer 151 to temporarily store the collected touch-down events. The command generator 165 may check whether a sensor signal is provided from the sensor signal collecting unit 163 while the touch-down event is maintained. If the sensor signal is received while the touch-down event is being maintained, the command generator 165 may generate a "multiple-input" command corresponding to the number of touched points of the touch-down event and a type and a form of the corresponding sensor signal. The number of points and the type and form of the sensor signal is then transferred to the function control unit 167. That is, the command generator 165 may generate a "multiple-input" command corresponding to multiple inputs corresponding to a touch-down event and a sensor signal. To do this, the command generator 165 may refer to the command table stored in the memory 150, and may perform a control operation to generate and transfer a preset command corresponding to the "multiple-input" command found in the corresponding command table. Furthermore, the command generator 165 may create respective "multiple-input" commands according to the number of touched points of a touch-down event, a type and a form of a sensor signal, and a type of a currently activated user function.

However, if a separate sensor signal is not transferred for a preset time in a maintained state of the touch-down event, the command generator 165 may generate and transfer a command corresponding to the collected touch-down events to the function controller 167. If another touch event, for example, a touch drag event or a touch release event is collected before the separate sensor signal is detected and/or transferred, the command generator 165 may generate a command corresponding to the previously collected touch-down event, touch drag event, or touch release event, and transfer the command to the function control unit 167. When a touch-down event and a sensor signal are not received substantially simultaneously, that is, when only the touch-down event or the sensor signal is collected in a "multiple-input" mode, the command generator 165 may generate and transfer a "single" command corresponding to the received signal to the function controller 167.

However, when the "multiple-input" mode is not set, and even though a touch-down event and a sensor signal are substantially simultaneously received, the command generator 165 generates and transfers individual commands corresponding to the received signals to the controller 167, so that the controller 167 may operate respective user functions according to the individual commands.

The function controller 167 (e.g., a processor) may control an operation of a user function corresponding to a command provided from the command generator 165. The function controller 167 may control the command generator 165 to activate a corresponding user function or operate a previously activated user function according to distinctly generated "multiple-input" commands according to various environments of the portable terminal 100. An embodiment of a user function activated or operated by the function controller 167 will be described with reference to following drawings in detail.

As illustrated previously, the portable terminal 100 according to an embodiment of the present invention may generate respectively distinct "multiple-input" commands based on the number of touched points of a touch-down event, and a type and a form of a sensor signal according to whether a "multiple-input" mode is set, and control activation of a user function(s) or an operation of an activated user function(s) based on the generated commands to operate the user function complicatedly or simply. In particular, the "multiple-input" support function may easily operate the portable terminal where the user moves to a frequently used screen or it is applied to restoration to the certain user function.

Figure 3:
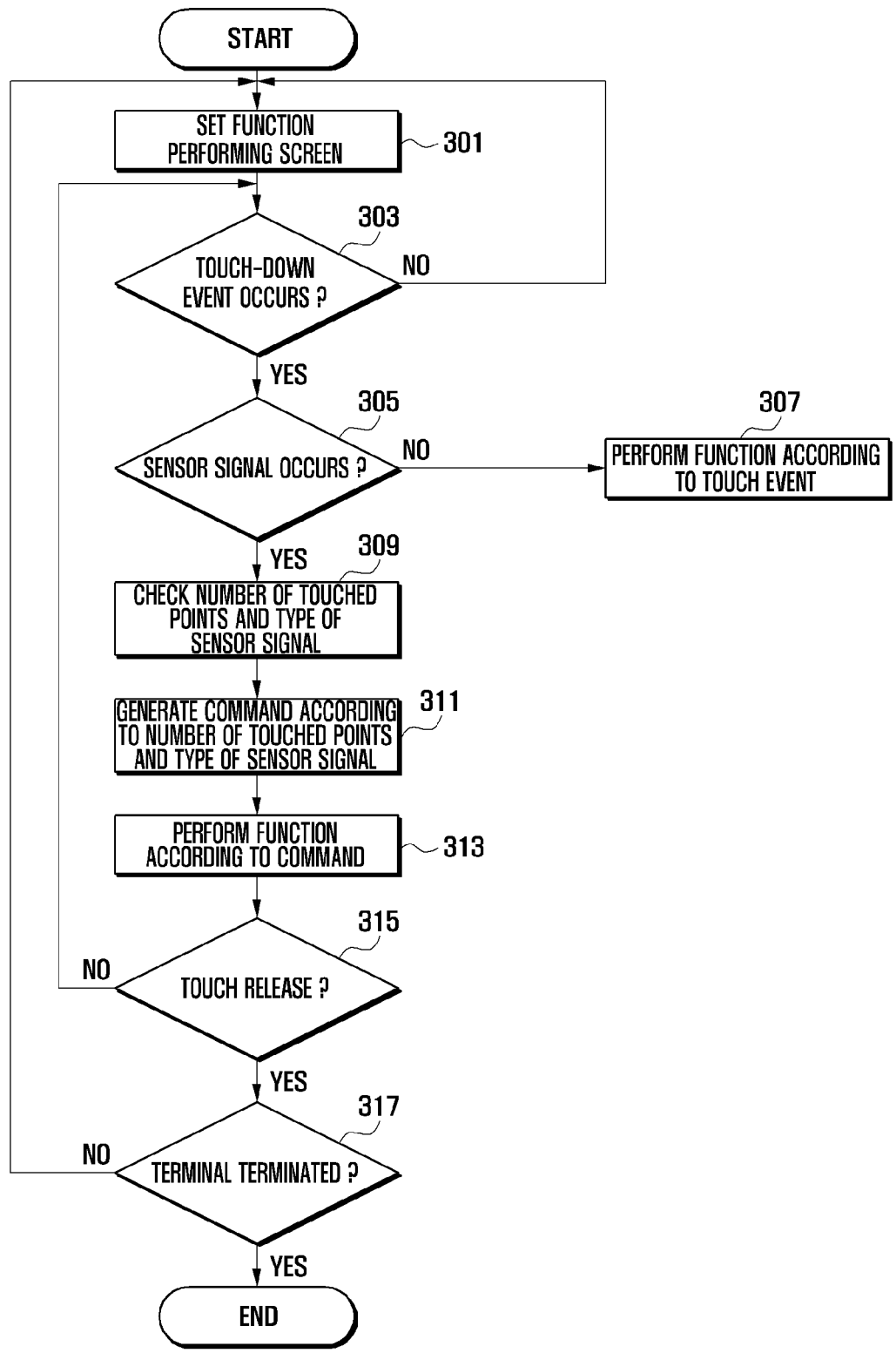
FIG. 3 is a flowchart illustrating a process for a terminal based on multiple inputs according to an exemplary embodiment of the present invention.

FIG. 3 is a flowchart illustrating an operating method of a terminal based on multiple inputs according to an exemplary embodiment of the present invention.

Referring to FIG. 3, in the operating method of a terminal based on multiple inputs, when power is supplied to the portable terminal 100, a controller 160 of the portable terminal 100 divides the supplied power to initialize respective structural elements. After the initialization procedure is completed, the controller 160 may perform a control operation to activate a certain user function. In this case, the user function may be an idle screen output function, a menu screen output function, or a web access function set according to schedule information. The user function may become a user function activated corresponding to a signal input from an input unit 120 according to the control of the user. Accordingly, the controller 160 may control a display panel 141 to output a screen according to performing the set function (301).

Next, the controller 160 may determine whether a touch-down event occurs (303). To do this, the controller 160 may control the touch panel 143 to be activated and scan the touch panel 143 during predetermined time periods or intervals to check whether a touch-down event has occurred. When a separate touch-down event has not occurred, the controller 160 may return to step 301 and repeat the foregoing procedures at subsequent time periods. When an input signal for terminating the portable terminal 100 is generated, the controller 160 may perform a control operation to terminate the operation of the portable terminal 100.

If the touch-down event occurs at step 303, the controller 160 may determine whether a sensor signal is generated (305). When a separate sensor signal is not generated at step 305, the controller 160 may control performing a function according to a touch event (307). That is, the controller 160 may generate an individual command according to the touch event, and applies the generated command to a currently activated user function or activates a corresponding user function.

When the sensor signal is determined to have been generated at step 305 substantially at the same time or during a prefixed time after the detection of the touchdown event or the sensor signal is generated in a maintained state of the touch-down event (i.e., a touch-release event has not yet been detected), the controller 160 may check the number of touched points detected during the touch down event and a type of the sensor signal (309). To do this, the controller 160 scans the touch panel 143 to collect the number of touched points and location information of the maintained touch-down event. Further, the controller 160 may check a type and a form of the sensor signal to recognize which sensor signal has been generated.

The controller 160 may perform a control operation to generate a command according to the number of touched points and a type of the sensor signal (311), and may perform a control operation to perform a function according to the generated command (313). In this case, the controller 160 may perform a control operation to operate on a currently activated user function according to a "multiple-input" command based on corresponding multiple inputs or to activate a new user function. The operation of the user function will be described in following embodiments in detail.

Subsequently, the controller 160 may check whether a touch release event occurs (315) (i.e., a removal of the touch down event from the touch panel). When a separate touch release event is not detected, the controller 160 may return to step 303 and repeat the foregoing procedures.

However, if the touch release event is detected at step 315, the controller 160 determines whether an input signal for terminating the portable terminal 100 is generated (317). When the input signal for terminating the portable terminal 100 is not detected, the process may return to step 301 and repeat the foregoing procedures.

However, when the input signal for terminating the operation of the portable terminal 100 (or the multi-input mode) is detected at step 317, the controller 160 may perform a control operation to terminate the operation of the portable terminal 100 (or he multi-input mode).

In the foregoing method for operating the terminal based on multiple inputs may be performed in a state in which a "multiple-input" mode is activated. When the "multiple-input" mode is not set, the controller 160 may generate separate commands according to a touch event and according to the sensor signal without performing step 309 and perform a corresponding function.

As illustrated earlier, an operating method of a terminal based on multiple inputs according to an embodiment of the present invention may generate respectively distinct "multiple-input" commands according to the number of touched points maintained on the touch panel 143 and a type and form of a sensor signal, and perform a control operation to perform a function based on the generated commands. In this case, the operating method of a terminal of the present invention may distinguish a command generated according to a currently activated user function, and perform an operation of a user function according to a corresponding command.

The foregoing embodiment has illustrated a portable terminal supporting a "multiple-input" mode and an operating method of a terminal according to an embodiment of the present invention. Hereinafter, various embodiments with respect to an operating method of a terminal based on a multiple inputs mode will be described.

FIG. 4 is a view illustrating an example of a screen interface for operating a terminal based on multiple inputs according to a first embodiment of the present invention. Each of screen regions 41, 43, and 45 may be a virtual arrangement screen region other than a real screen region.

Referring to FIG. 4, a portable terminal 100 user may create an input signal for activating a message or memo creating function using an input unit 120 through control of a terminal. In this case, the portable terminal 100 may provide a calculator function 41, a file playback function 45, and a calendar function 43 in a previously activated state according to a user request that supports a multi-tasking function.

For example, the portable terminal 100 may control a display panel 141 to output a screen corresponding to a calendar function on the display panel 141 as illustrated in a screen 43 of a screen 401 according to a request for activating the calendar function. Meanwhile, the user may operate the input unit 102 or the touch panel 143 to generate an input signal for activating a message or memo creating function. Accordingly, as illustrated in a screen 401, the portable terminal 100 may control the display panel 141 to output a screen corresponding to a corresponding message or memo function. In this case, the portable terminal 100 may control a screen 43 corresponding to a previously activated calendar function to be performed by background processing based on a multi-tasking function.

In the meantime, as illustrated in a screen 401, in a state that a screen corresponding to a message or memo creating function is output on the display panel 141, the controller 160 may control activation of a touch panel for inputting characters. In this case, as shown, the user may create a touch-down event having one touched point 1P at a known region of the display panel 141; e.g., at one side of a region in which an input character is output. Accordingly, the portable terminal 100 may change a type of a selection user function according to multiple inputs to be later provided. For example, when the user performs a tilt operation in a predetermined direction, for example in a left direction together with a touch-down event having one touched point 1P, a sensor 170 of the portable terminal 100 may collect a sensor signal corresponding to the tilt operation.

Accordingly, if a right tilt sensor signal is collected in a state in which a touch-down event having one touched point 1P is maintained, the portable terminal 100 may control the display panel 141 to output a screen 43 corresponding to a calendar function as illustrated in a screen 403. Alternatively, when a touch-down event having one touched point 1P signal and a left tilt sensor signal are generated according to a tilt direction, a screen 41 corresponding to a calculator function may be output on the display panel 141. When a touch-down event having one touched point 1P signal and a downward tilt sensor signal are generated, a screen 45 corresponding to a file playback function may be output on the display panel 141.

In the meantime, if a touch-down event having one touched point 1P occurs on a character output region in a screen 401, the portable terminal 100 may perform a control operation to output icons 51, 53, and 55 capable of identifying other user functions to be selected at one side of the display panel 141 according to a tilt direction in order to support a "multiple-input" mode. In this case, the other user functions may become user functions that are previously activated by a multi-tasking function but have not yet been selected. Accordingly, the number and forms of the icons 51, 53, and 55 may be changed according to the number and types of the other user functions being performed by the multi-tasking function. For example, when a file playback function is not performed, although a touch event having one touched point 1P occurs, the icon 55 may not be output on the display panel 141. When four user functions, in addition to the user function being currently output on the display panel 141, may be activated by a multi-tasking function, a screen may be switched to a corresponding user function by an upward lift or tilt. When a touch-down event having one touched point 1P is output, an icon corresponding to an upward tilt direction may be output on the display panel 141. Further, icons indicating a multi-tasking based user function may be output at a predetermined region of a display panel 141 in a generation direction of a sensor signal.

When a screen is switched from a screen corresponding to a message or memo creating function to a screen 43, the screen corresponding to a message or memo creating function may be virtually arranged in a region of a screen 41, and a screen of a calculator function may be virtually arranged at a region of the screen 43. Accordingly, the user may perform a touch-down event and left tilt opposed to a previously performed right tilt for a restoring function to a previous screen.

Figure 5:
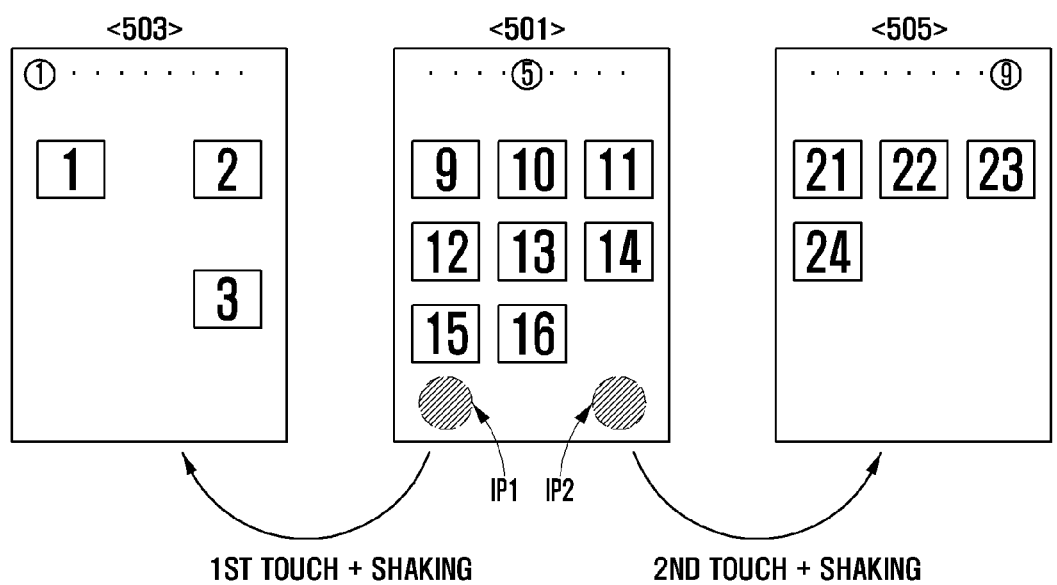
FIG. 5 is a view illustrating an example of a screen interface for operating a terminal based on multiple inputs according to a second embodiment of the present invention.

FIG. 5 is a view illustrating an example of a screen interface for operating a terminal based on multiple inputs according to a second embodiment of the present invention.

Referring to FIG. 5, a portable terminal 100 of the present invention may output a screen on which at least one of a certain menu icon or a widget icon is output on the display panel 141 as illustrated in a screen 501 on the display panel 141 according to the control of the user. Further, the portable terminal 100 may support switching to another menu page or widget page according to the control of the user, in particular, to generation of a left or right sweep event on the touch panel 143.

In particular, when a touch-down event occurs at a first touched point 1P1 as illustrated in a screen 501 to collect a sensor signal corresponding to shaking in a created state of a command corresponding to a first touch, the portable terminal 100 of the present invention may control the movement of a screen to a first menu page of a plurality of menu pages as illustrated in a screen 503. The movement of the screen to the first menu page may be performed regardless of the number of current menu pages. That is, if a touch-down event of a first touched point 1P1 and a shaking sensor signal are collected in a state in which menu pages 2-9 are output on the display panel 141, the controller 160 of the portable terminal 100 may control the display panel 141 to output the first menu page.

When a sensor signal corresponding to shaking is collected in a state that a touch-down event occurs at a second touch point 1P2 in a screen 501 to generate a command corresponding to a second touch, the portable terminal 100 may control the screen movement to a last page (i.e., the ninth menu page) of the plurality of menu pages in as illustrated in screen 505. The screen movement to the last menu page may be performed regardless of the number of menu pages if the second touch and shaking sensor signal is generated in a state in which menu pages 1-8 are displayed.

The first touched point 1P1 and the second touched point 1P2 may become an optional point on the display panel 141. The controller 160 may allot or assign a left region and a right region of a center line of the display panel 141 to a region generating a first touch and a region generating a second touch so that the user easily recognizes the region and the corresponding input.

As illustrated previously, the portable terminal 100 of the present invention may control a screen movement to a first or a last page to be performed in a certain user function, for example in a page view function according to a multiple input signal.

Figure 6:
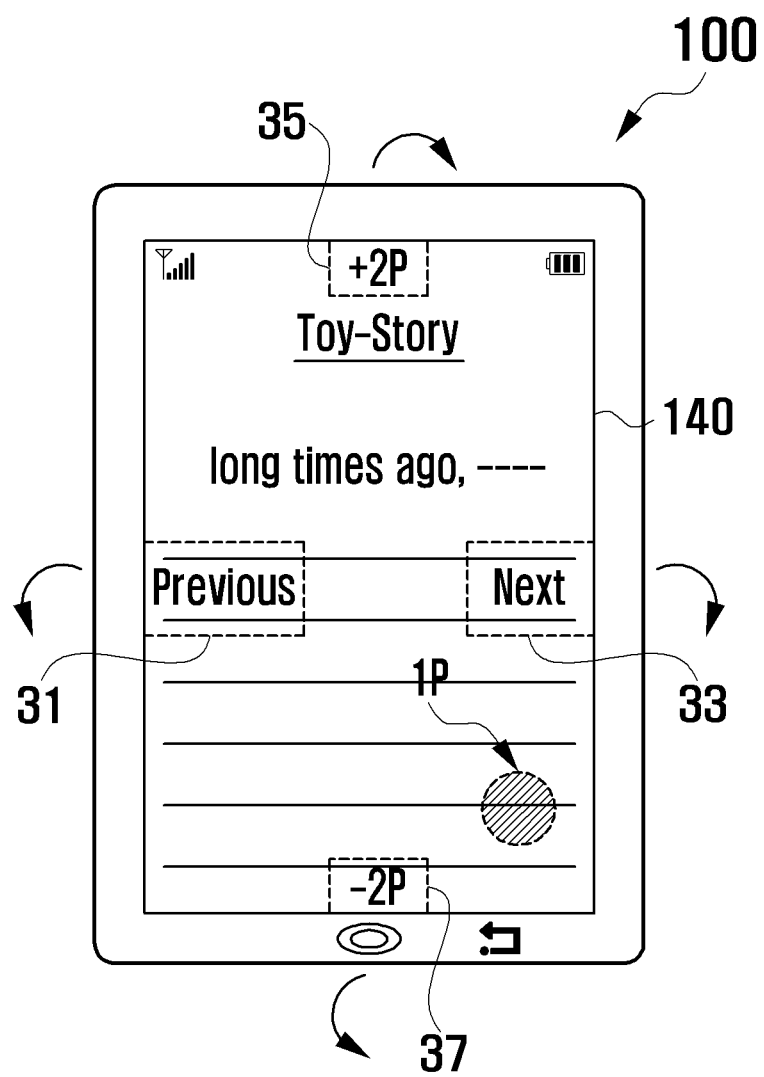
FIG. 6 is a view illustrating an example of a screen interface for operating a terminal based on multiple inputs according to a third embodiment of the present invention.

FIG. 6 is a view illustrating an example of a screen interface for operating a terminal based on multiple inputs according to a third embodiment of the present invention. The Multiple Input mode can be setting according to a user setting or default mode, or activating a specific program.

Referring to FIG. 6, a portable terminal 100 of the present invention may output an e-book screen according to the control of the user. To do this, the user may perform a control operation to generate an input signal for selecting e-book contents. If the user creates an input signal for activating e-book contents, the controller 160 of the portable terminal 100 may activate corresponding e-book contents and control the display panel 141 to output a certain page corresponding to activation of the e-book contents on the display panel 141.

If the user generates a touch-down event having one touched point 1P at a certain region of the display panel 141 in a state that a certain page is output on the display panel 141 during a playback function of e-book contents, the controller 160 may perform a control operation to output various auxiliary icons 31, 33, 35, and 37 supporting a page skip function on a specific region of the display panel 141 as shown. For example, the controller 160 performs a control operation to output an icon 31 for selecting a previous page, an icon 33 for selecting a next page, an icon 35 for supporting next skip two pages, an icon 37 for supporting a skip previous two pages at a left center, a right center, an upper center, and a lower center of the display panel, respectively.

Accordingly, the user may generate a touch-down event having one touched point 1P at a certain region of the display panel 141 and then tilt the portable terminal 100 for page skip operation by referring to the icons 31, 33, 35, and 37 output on the display panel 141. That is, the controller 160 may perform a page skip control operation of e-book contents according to a touch-down event corresponding to one touched point 1P and a tilt direction. For example, if the user controls the portable terminal 100 to generate a touch-down event and a lower direction tilt sensor signal, the controller 160 may control the display panel 141 to output a page corresponding to 2 previous pages from the current page on the display panel 141. In the case, there are no previous pages, the controller 160 may perform a control operation to temporarily output a message indicating that a current page is either the first or second page as two previous pages do not exist.

Figure 7:
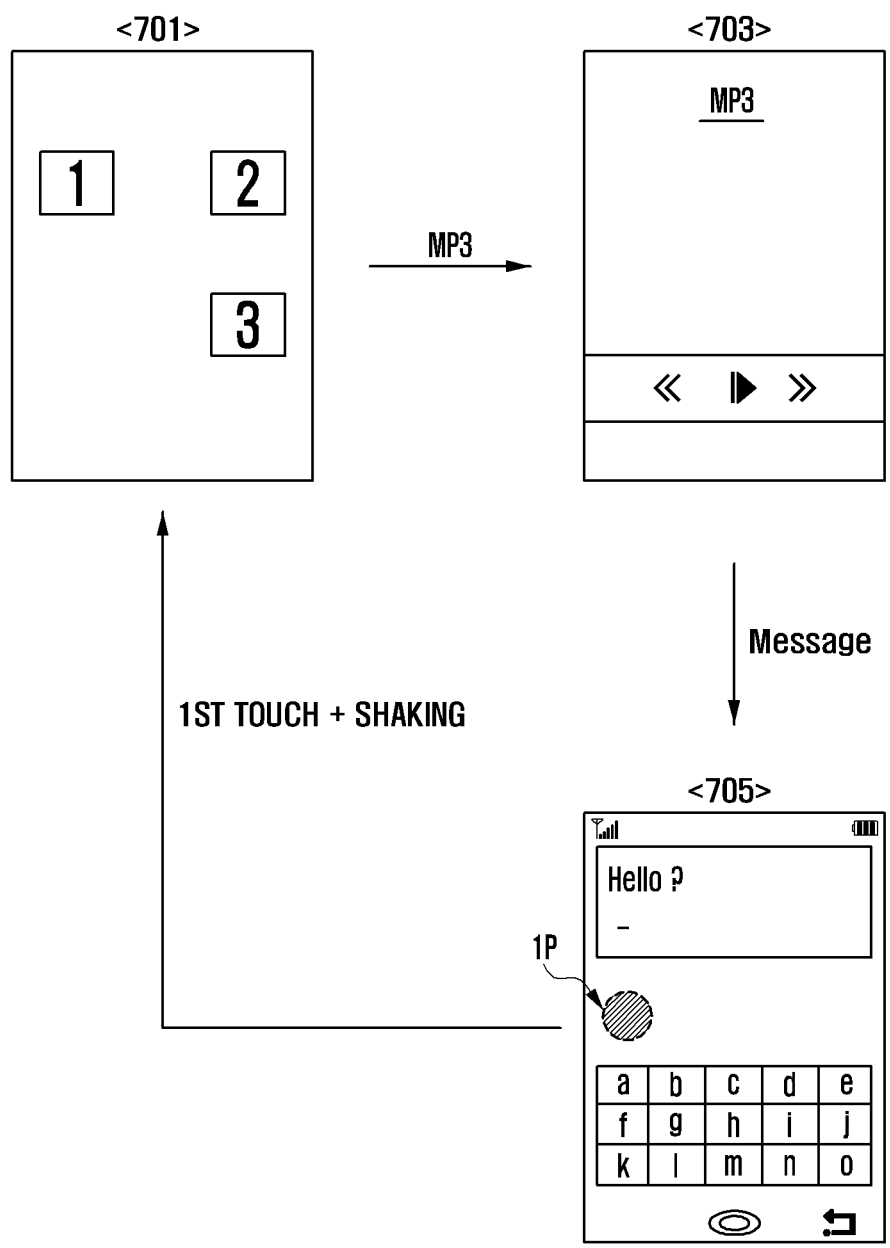
FIG. 7 is a view illustrating an example of a screen interface for operating a terminal based on multiple inputs according to a fourth embodiment of the present invention.

FIG. 7 is a view illustrating an example of a screen interface for operating a terminal based on multiple inputs according to a fourth embodiment of the present invention.

Referring to FIG. 7, a portable terminal 100 of the present invention may control a display panel 141 to output a menu screen as illustrated in a screen 701 according to the control of the user or previous setting after initialization. When the user creates an input signal, for example, that performs menu selection for activating a certain user function, (e.g., an MP3 function), the portable terminal 100 may control the display panel 141 to output a screen corresponding to activation of an MP3 function as illustrated in a screen 703. In this procedure, the portable terminal 100 may perform a control operation to play certain contents selected according to detection of an input signal or preset contents and output a corresponding audio signal through an audio processor 130.

Meanwhile, in a state that the MP3 function is performed, the user may create an input signal for activating a user function for a message or memo creating function according to an operation of a multi-tacking function. Accordingly, the portable terminal 100 may control the display panel 141 to output a user interface for the message or memo creating function as illustrated in screen 705. When the user wants to restore to an initial user function screen, namely, a screen 701 corresponding to a main page, the user may perform a control operation to generate a shaking sensor signal together with a first touch corresponding to a touch-down event having one touched point 1P on a certain region. Accordingly, the portable terminal 100 may perform restoration from a screen 705 to a screen 701 as shown. In this case, the controller 160 of the portable terminal 100 may maintain an MP3 function, a message creating function, or a memo creating function as a multi-tasking function.

As illustrated earlier, although the user operates a certain user function of the portable terminal 100, the multiple inputs operation of the present invention may support a home screen function switched to a desired page of a certain user function through generation of a certain "multiple-input" signal. In this case, a corresponding user function in a page switching to the home screen function may be controlled according to a user's setting. For example, when the portable terminal 100 generates a shaking sensor signal together with a touch event having one touched point 1P, the terminal supports rapid switching to an "idle screen", a "menu screen", or a "lock screen" designated as a home screen, and the home screen designation screen may be controlled according to the user's setting as illustrated above. When a plurality of user functions are performed based on multi-tacking to maintain the touch-down event and to generate a certain sensor signal in a state that a screen corresponding to a certain user function is output, the present invention may control a screen to be switched to a certain user function screen set according to a location on a touch panel in which the touch-down event occurs and a generated direction of a certain sensor signal.

Figure 8:
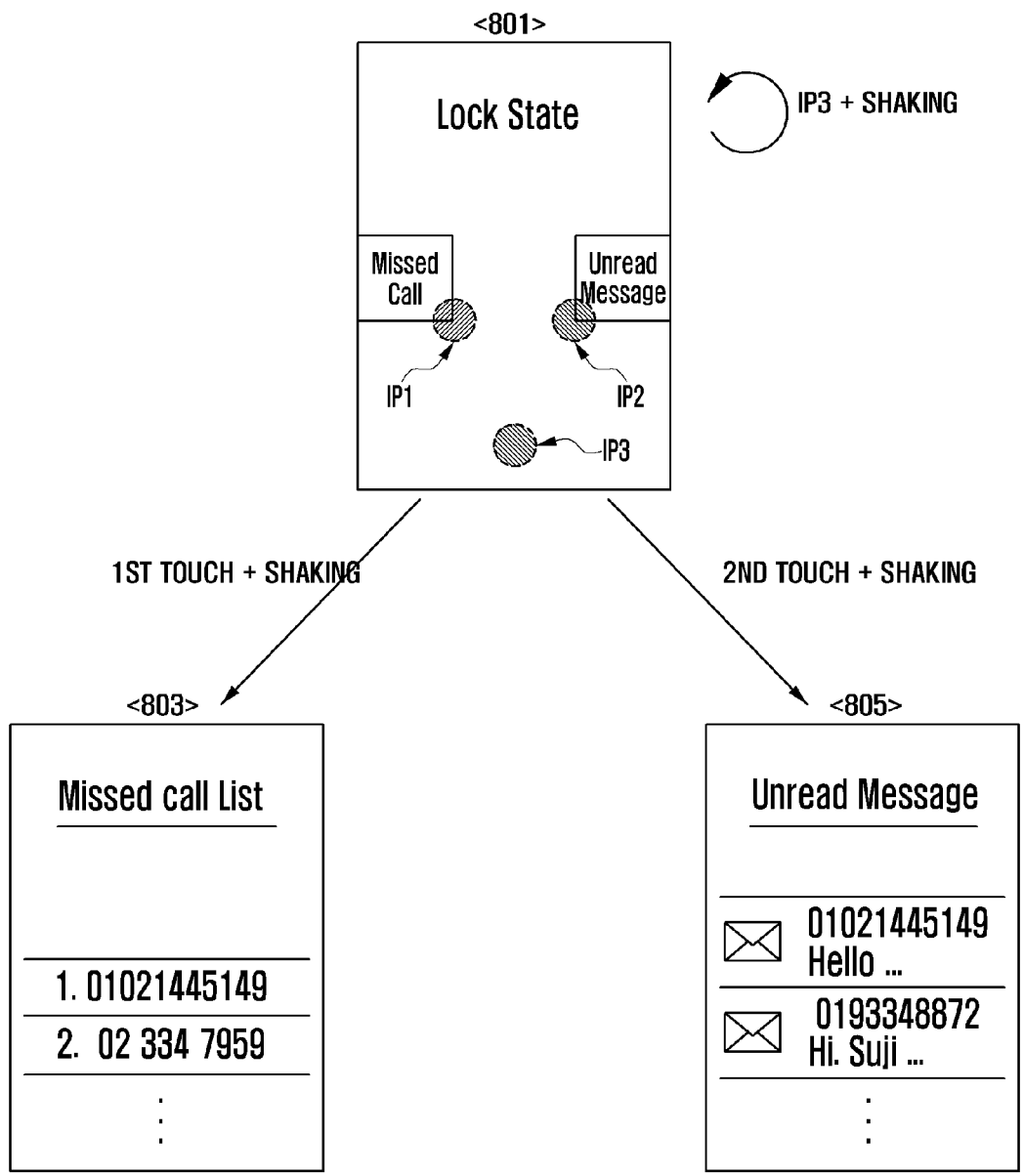
FIG. 8 is a view illustrating an example of a screen interface for operating a terminal based on multiple inputs according to a fifth embodiment of the present invention.

FIG. 8 is a view illustrating an example of a screen interface for operating a terminal based on multiple inputs according to a fifth embodiment of the present invention.

Referring to FIG. 8, a portable terminal 100 of the present invention may maintain a "lock state" as illustrated in a screen 801 according to the control of the user or preset schedule information. In the meantime, when a call or a message requesting call connection is received in the "lock-state" and the user does not respond to the received call or message, the portable terminal 100 may perform a control operation to output icons indicating a guide message guiding alarm of at least one of a missed call or an unread message on the display panel 141 in the lock state as illustrated in a screen 801. The user may check the missed call or the unread message by checking the display panel 141.

In this case, when a missed call icon is output, the user creates a first touch corresponding to a touch-down event having a first touched point 1P1 and a certain sensor signal, for example, a sensor signal corresponding to a shaking, the portable terminal 100 may control the display panel 141 to output a screen interface capable of checking the missed call as illustrated in a screen 803. Accordingly, the user may check a missed call list through a screen 803. In the meantime, after checking the missed call list, the user may perform a control operation to generate a "multiple-input" command, for example, a touch-down event in a certain region among regions of a display panel 141 in the screen 803 and a certain sensor signal, for example, a shaking sensor signal, for switching to a lock state like the state 801. Note that checking the missed call causes the system to be un-locked. Accordingly, the controller 160 of the portable terminal 100 may control switching from a screen 803 to a screen 801. At this time, the controller 160 outputs the screen 801 and may perform a control operation to remove a corresponding missed call from the screen 801 through the process of checking the missed call. In this case, only a "Unread Message" icon region may be output on the screen 801.

Meanwhile, when the user performs an operation of the portable terminal 100 corresponding to collection of a second touch corresponding to a touch-down event having a second touched point 1P2 and a shaking sensor signal in which the unread message icon is output, the controller 160 may control the display panel 141 outputting a unread message list as illustrated in a screen 805. After terminating the process of checking the unread message in the screen 805, the user may generate a touch-down event and a shaking sensor signal as illustrated in a description of the screen 803 for restoration to the screen 801. In this case, the controller 160 of the portable terminal 100 may perform a control operation to remove the unread message from the screen 801 through the process of checking the unread message.

In the meantime, when the user creates a touch-down event in a third touched point 1P3, namely, another region except for a region to which the missed call icon and the unread message icon are output and performs a shaking action, the controller 160 may perform a control operation not to perform a separate operation change.

When the user creates a certain sensor signal, for example, a sensor signal according to performing a shaking back and forth after generating the touch-down event on the touch screen 140, the portable terminal 100 may perform a control operation to release a set "lock state". In this case, the portable terminal 100 may perform a control operation to output at least one of a missed call list or an unread message list on the display panel together with a release of the lock state. That is, the portable terminal 100 may perform a control operation to perform a certain user function together with a release of a touch lock according to generation of a touch-down event having one or two touched points and a preset certain sensor signal of the touch screen 140 as well as a touch-down event and certain shaking of the portable terminal. Further, when a touch-down event having one or two touched points and a certain sensor signal are generated in a released state of the touch lock, the portable terminal 100 of the present invention may control the terminal back to a touch lock state.

Figure 9:
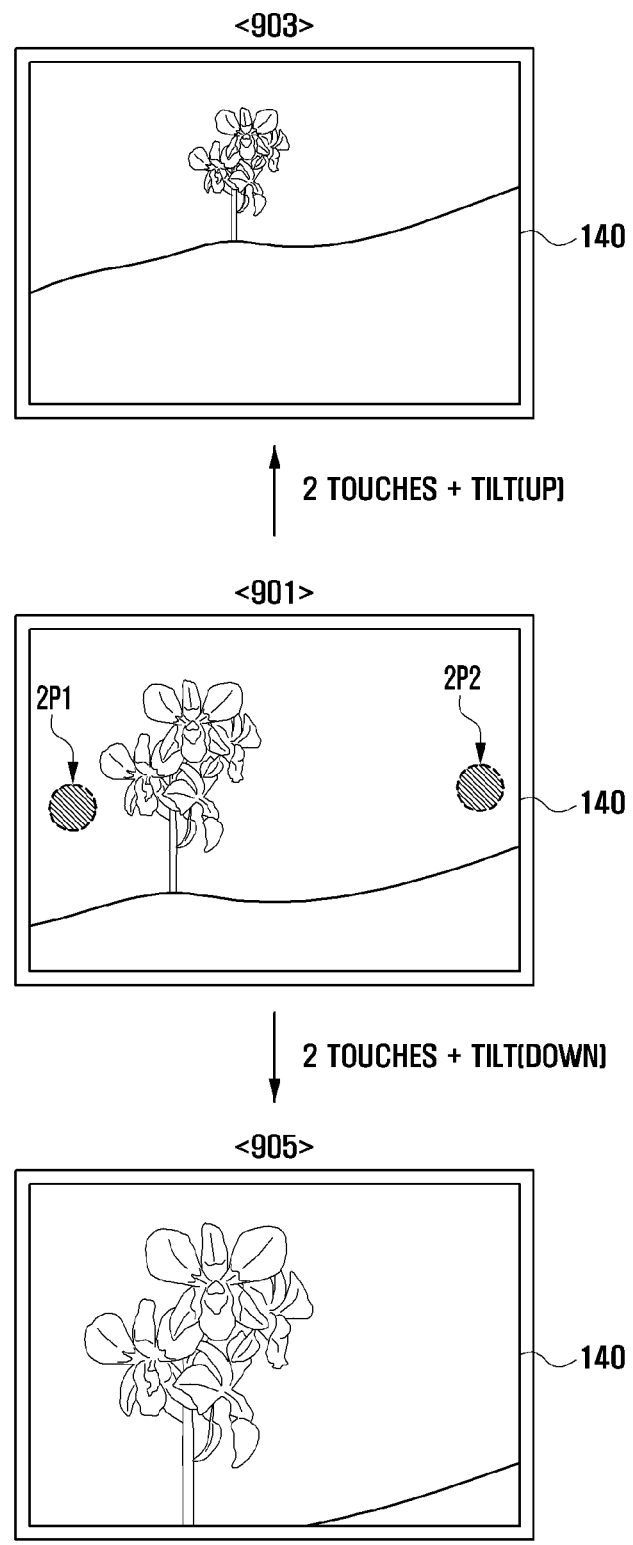
FIG. 9 is a view illustrating an example of a screen interface for operating a terminal based on multiple inputs according to a sixth embodiment of the present invention.

FIG. 9 is a view illustrating an example of a screen interface for operating a terminal based on multiple inputs according to a sixth embodiment of the present invention.

Referring to FIG. 9, a portable terminal 100 of the present invention may control the display panel 141 to output a certain image file according to the control of the user as illustrated in a screen 901. To do this, the user may perform a control operation to generate an input signal to activate a photograph file search function or a gallery function.

Meanwhile, the user may control the portable terminal 100 to generate the second touch corresponding to a touch-down event having two touched points 2P1 and 2P2 on the touch panel 143 and a sensor signal corresponding to tilt in a predetermined direction, for example, upward direction in a state that a certain image file is output on the display panel 141. Accordingly, the controller 160 may perform a control operation to zoom-out and output an image displayed on the display panel 141 as illustrated in a screen 903. Further, when the foregoing second touch and a sensor signal corresponding to tilt in a downward direction are generated, the controller 160 may perform a control operation to zoom-in and output the image displayed on the display panel 141.

In this case, the upward direction may be a direction tilting an upper edge of the portable terminal 100 in an outside direction based on a body (away from the user) of the user substantially gripping the portable terminal 100. Conversely, the downward direction may be a direction tilting an upper edge of the portable terminal 100 in an inside direction based on a body of the user (toward the user) substantially gripping the portable terminal 100. The foregoing embodiment has illustrated that a type of a sensor signal is an upper or lower tilt direction. However, the present invention is not limited thereto. That is, a switching function from a screen 901 to a screen 903 may perform a control operation to perform a second touch corresponding to a touch-down event having two touched points 2P1 and 2P2, and a zoom-out function in the case of a direction in which the portable terminal 100 is spaced apart from the user and a zoom-in function in the case of a direction in which the portable terminal 100 gets close to the user. For example, when a user pulls the portable terminal 100 to a body of the user while gripping the portable terminal 100 by both hands and maintaining two touched points 2P1 and 2P2 in a touch-down state, the controller 160 may perform a control operation to output an enlarged image. In the same state, when the user pushes the portable terminal 100 away from the body, the controller 160 may perform a control operation to output a reduced image. In the meantime, zoom-in and zoom-out functions based on multiple inputs of the present invention are equally applicable to not only image enlargement and reduction functions but also extension and reduction functions with respect to a subject when taking a picture.

Figure 10:
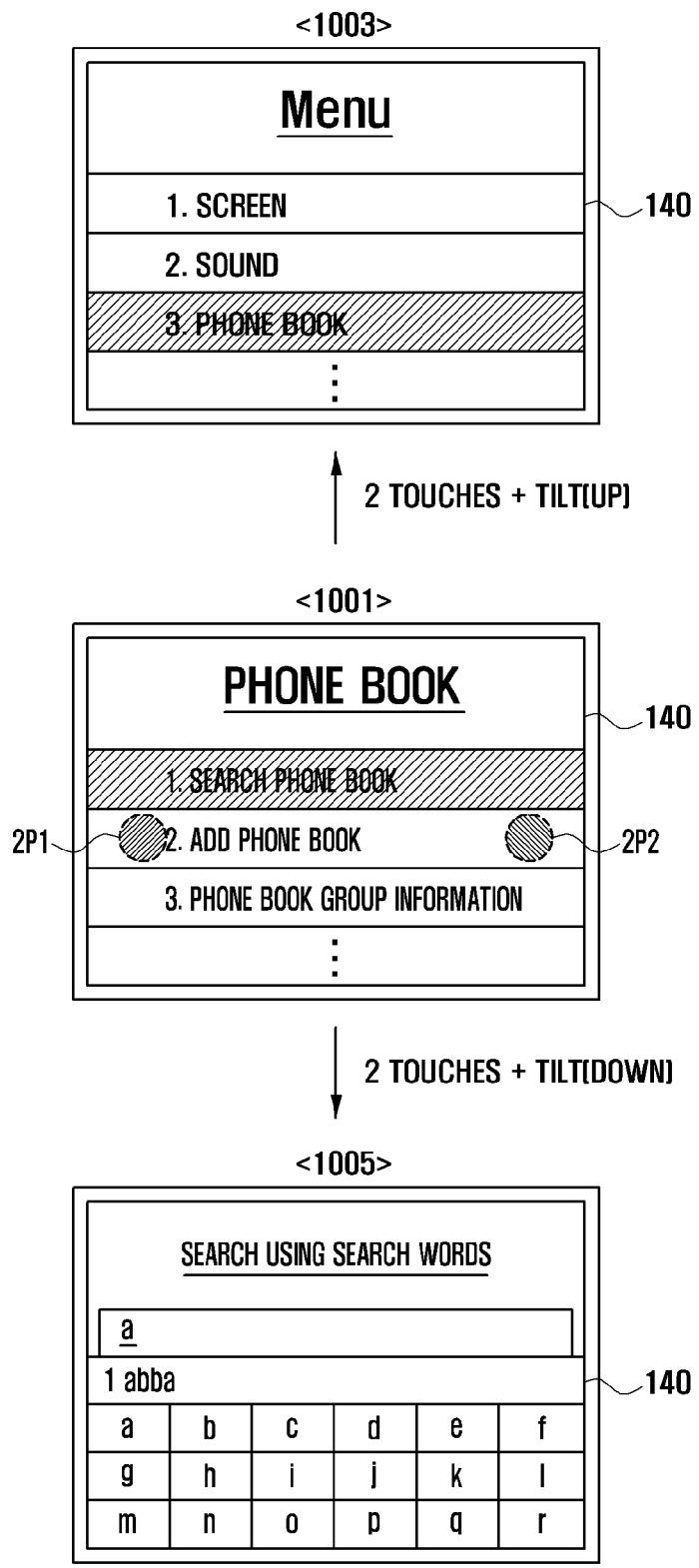
FIG. 10 is a view illustrating an example of a screen interface for operating a terminal based on multiple inputs according to a seventh embodiment of the present invention.

FIG. 10 is a view illustrating an example of a screen interface for operating a terminal based on multiple inputs according to a seventh embodiment of the present invention.

Referring to FIG. 10, a portable terminal 100 of the present invention may output a phone book menu on a display panel 141 as illustrated in a screen 1001 according to the control of the user. To do this, the user may select an item for selecting the phone book menu among menu items. Meanwhile, the user may control the portable terminal 100 to generate a certain sensor signal, for example, a tilt sensor signal corresponding to tilt in an upward direction, while generating a second touch corresponding to a touch-down event having two touched points 2P1 and 2P2 in a predetermined region of the display panel 141 while the phone book menu is output of the display panel 141. Accordingly, the controller 160 may perform a control operation to output a menu screen corresponding to an upper item of a corresponding phone book menu as illustrated in a screen 1003. Further, the user may control the portable terminal 100 to generate a certain sensor signal, for example, a tilt sensor signal corresponding to a tilt in a downward direction while generating a second touch corresponding to a touch-down event having two touched points 2P1 and 2P2 at a predetermined region of the display panel 141. Accordingly, the controller 160 may control the display panel 141 to output a "search using search words" screen corresponding to a certain item selected from a corresponding phone book menu, for example, a detailed item of an item "search phone book" as illustrated in a screen 1005.

As illustrated previously, the operating method of a terminal based on "multiple-input" commands according to an embodiment of the present invention may rapidly perform movement of an upper or lower category according to a type and a form of sensor signal when a certain sensor signal is generated while maintaining a touch-down event having two touched points 2P1 and 2P2.

Figure 11:
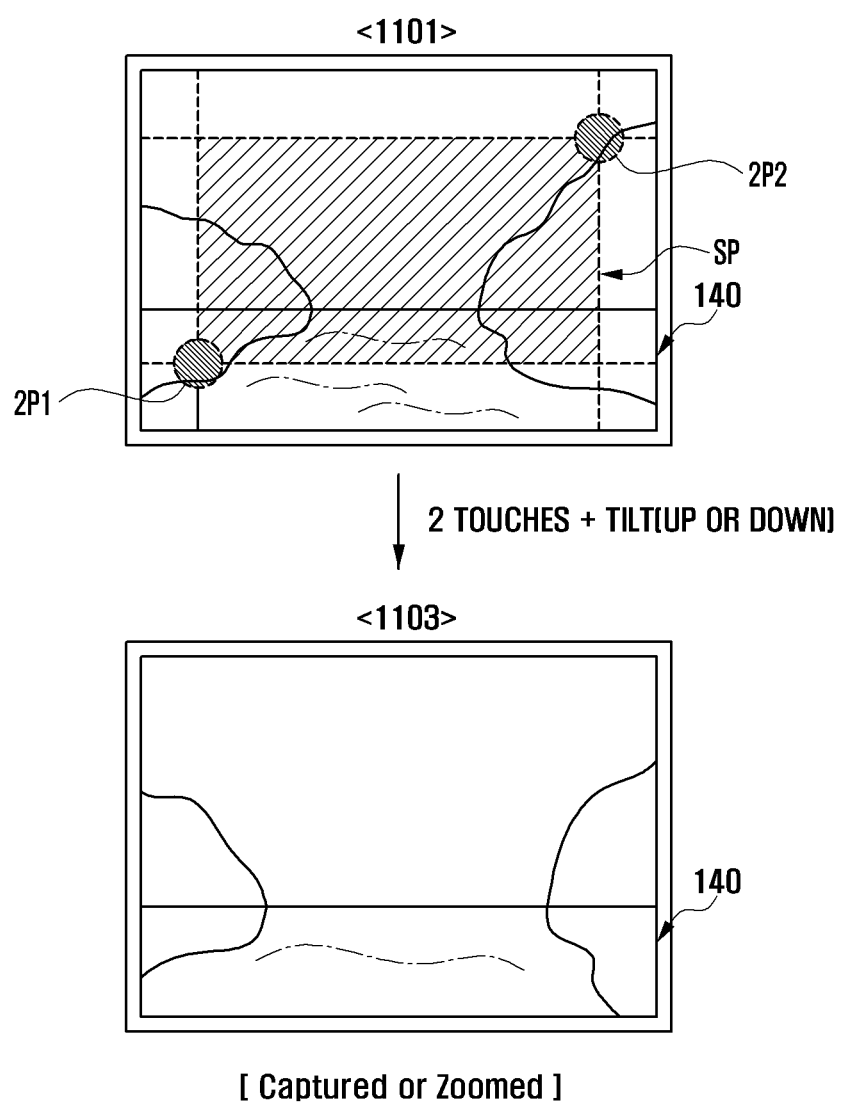
FIG. 11 is a view illustrating an example of a screen interface for operating a terminal based on multiple inputs according to an eighth embodiment of the present invention.

FIG. 11 is a view illustrating an example of a screen interface for operating a terminal based on multiple inputs according to an eighth embodiment of the present invention.

Referring to FIG. 11, a portable terminal 100 of the present invention may control the display panel 141 to output an image file according to the control of the user. To do this, the user may control generation of an input signal for playing a certain image stored in the memory 150, for example, a photograph file or a moving image file. Accordingly, the portable terminal 100 performs a control operation to play a file selected by the user and output a corresponding photograph image or moving image on the display panel 141 as illustrated in a screen 1101.

Meanwhile, in a state that an image is output on the display panel 141 as illustrated in a screen 1101, the user may generate a second touch corresponding to a touch-down event having two touched points 2P1 and 2P2 on the touch panel 141, and generate a certain sensor signal, for example, tilt the portable terminal 100 upward or downward. Accordingly, the portable terminal 100 may perform a control operation to capture or extend a predetermined region SP of the display panel 141 based on two touched points 2P1 and 2P2 as illustrated in a screen 1103. In this case, the predetermined region SP based on the two touched points 2P1 and 2P2 may become a region in a closed curve formed by connecting virtual left and right axes to each other based on the two touched points 2P1 and 2P2.

In the meantime, the foregoing embodiment has illustrated that the sensor signal is a signal corresponding to a tilt operation of the portable in a predetermined direction. However, the present invention is not limited thereto. That is, the user may shake the portable terminal 100 together with the second touch to generate a shaking sensor signal. In this case, the shaking operation may include shaking back and forth as well as shaking left and right.

Figure 12:
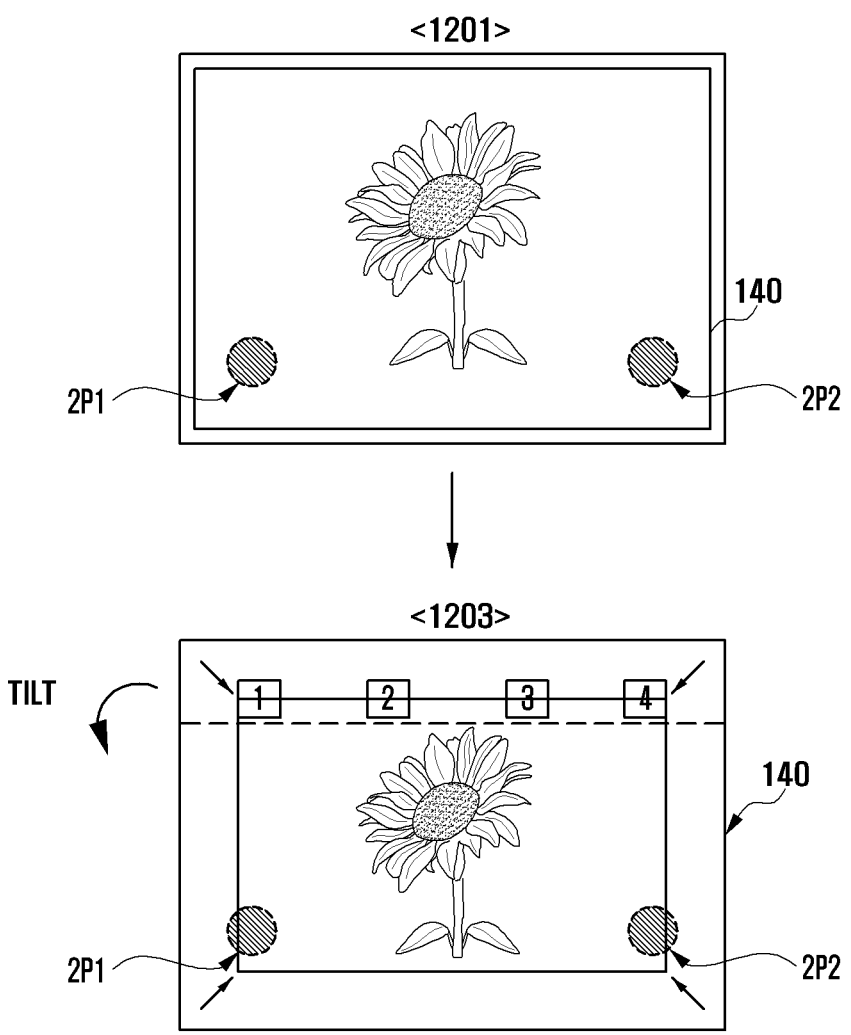
FIG. 12 is a view illustrating an example of a screen interface for operating a terminal based on multiple inputs according to a ninth embodiment of the present invention.

FIG. 12 is a view illustrating an example of a screen interface for operating a terminal based on multiple inputs according to a ninth embodiment of the present invention.

Referring to FIG. 12, a portable terminal 100 of the present invention may control the display unit 141 to output an idle screen or a certain image as illustrated in a screen 1201 according to the control of the user or preset schedule information.

Meanwhile, the user may perform an operation for generating a "multiple-input" signal to activate a certain user function on the display panel 141 on which the idle screen or the certain image is output. For example, the user may generate a second touch corresponding to a touch-down event having two touched points 2P1 and 2P2 at a certain region of the display panel 141 as shown, and tilt the portable terminal 100 to a predetermined direction in a maintained state of the touch-down event. If the second touch and a tilt sensor signal in the predetermined direction are collected substantially simultaneously, the controller 160 may perform a control operation to resize the image or the idle screen output on a screen 1201 to a predetermined size and arrange it at a side of a screen, for example, a center thereof, and to output certain menu icons on a portion of the display panel 141 created according to the adjustment of the size of the image or the idle screen. In this case, as shown, certain menu icons may be output on the unoccupied area of the display panel 141 in a direction, namely, an upward direction in which the tilt sensor signal is collected. The size of an additional region in which menu icons are arranged on the display panel 141 may be changed according the size of the sensor signal, namely, a tilt angle. That is, when the tilt angle is large, the additional region output on the display panel 141 in which certain menu icons are arranged may be large. When the tilt angle is small, the additional region output on the display panel 141 in which certain menu icons are arranged may be small. Meanwhile, the number of menu icons output on a corresponding additional region may be changed according to the size of the arranged additional region. That is, when the arranged additional region is large more menu icons may be arranged on the additional region. When the arranged additional region is small, less menu icons may be arranged on the additional region.

Accordingly, the user may select one from the menu icons output on the display panel 141 to operate a certain user function. In this case, if the certain user function is selected, the screen 1203 may be substituted by a screen corresponding to the selected user function.

The foregoing embodiment has illustrated that an output direction of a certain menu icon is an upper blank of the display unit. However, the present invention is not limited thereto. The menu icon(s) may be output on the display unit in a tilt direction or a direct opposed thereto. In the meantime, the user may release a touch-down event to select a certain icon among the menu icons output on the display unit. Accordingly, although a touch in at least a partial point of the touch-down event is released in a state of a screen 1203, the portable terminal 100 may maintain a corresponding screen state.

Figure 13:
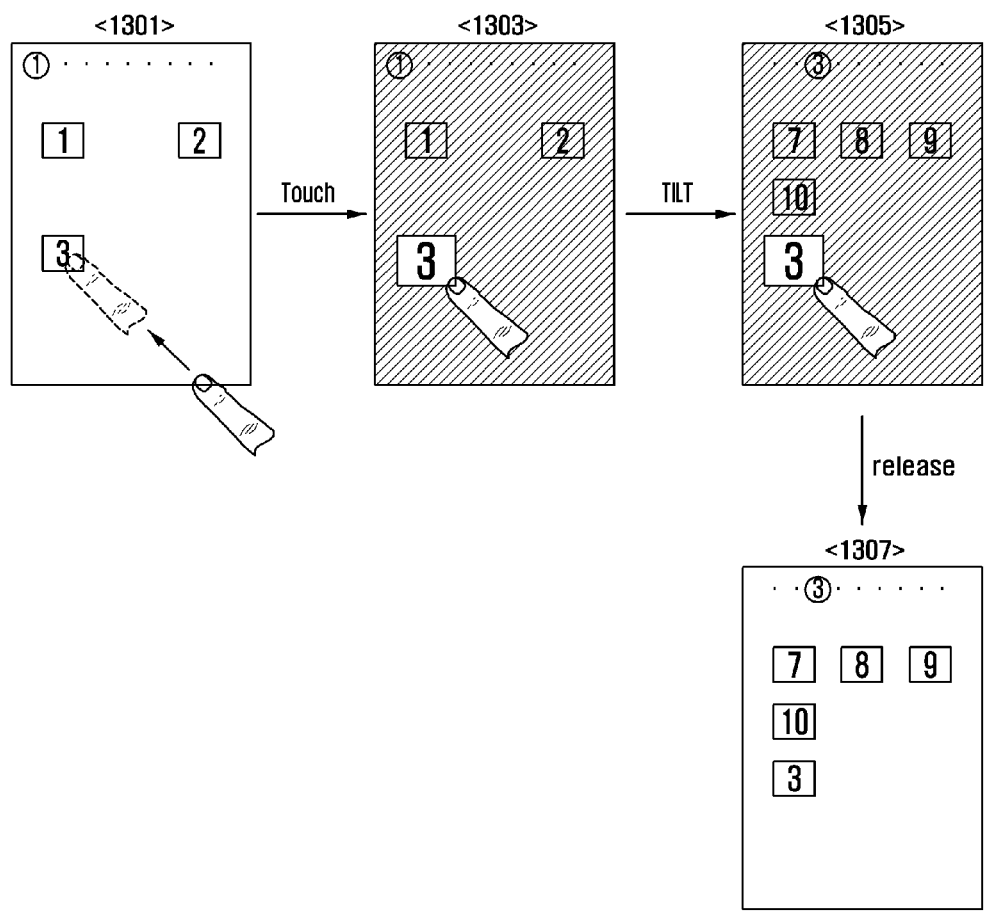
FIG. 13 is a view illustrating an example of a screen interface for operating a terminal based on multiple inputs according to a tenth embodiment of the present invention.

FIG. 13 is a view illustrating an example of a screen interface for operating a terminal based on multiple inputs according to a tenth embodiment of the present invention.

Referring to FIG. 13, a portable terminal 100 of the present invention may perform a control operation to output an idle screen on a display panel 141 according to the control of the user or preset schedule information, or output a preset menu screen on the display panel 141 as illustrated in a screen 1301. For example, the portable terminal 100 may output a menu screen corresponding to a first page among menu pages composed of a plurality of pages. The first page of a screen is configured by a screen on which a plurality of menu items, for example, three menus are arranged.

In this state, a user of the portable terminal 100 wants to be able to move a certain menu item, for example, a "3" menu item to another menu page. Accordingly, the user may create a touch-down event on a touch screen 140 on which a corresponding item, namely, a "3" menu item is output. In particular, the user may create a touch event of a long touch form having a touch-down state for longer than a predetermined time on a region in which the "3" menu item is output.

Accordingly, the portable terminal 100 may perform a control operation to divide a selected "3" menu item as illustrated in a screen 1303 into a previously arranged menu page and a layer phase. In this case, the portable terminal 100 changes illumination and saturation of a menu page in which a "1," and "2" menu item are arranged and increases the size of the selected "3" menu item so that the "3" menu item visibly expresses that the layer phase is separated from a menu page. In this state, the user may continuously maintain a touch-down event.

Meanwhile, the user may perform a control operation to tilt the portable terminal 100 in a predetermined direction, for example, in a left direction in a maintained state of the touch-down event, so as to search a menu page for moving the "3" menu item. Accordingly, the portable terminal 100 may perform a control operation to perform a page skip of a menu page. In this case, the portable terminal 100 may output screen variation according to the page skip on the display panel. In the procedure, the "3" menu item maintains a continuously output state in a location in which the touch-down event is maintained. When the user stops a tilt operation in a third page of a menu to arrange the "3" menu item in the third page of a menu, the third page of a menu may be output on a touch screen as illustrated in a screen 1305. Accordingly, a user of the portable terminal 100 may perform a drag operation to a space in which a "3" menu item will be arranged while maintaining a touch-down state to move the "3" menu item. When separate movement is unnecessary, the drag operation may not be performed.

Next, the user of the portable terminal 100 may perform a control operation to generate a touch release event so as to apply the "3" menu item to a third page of a menu. Accordingly, the "3" menu item may be arranged at a predetermined location of the third page of a menu as illustrated in a screen 1307. At this time, the portable terminal 100 may control the size of the "3" menu item to be similar to that of other menu items. In particular, the portable terminal 100 may change illumination and saturation of a menu page in screens on which a "3" menu item are output for movement, namely, screens 1303 and 1305 to display that the "3" menu item is being separated from the layer phase. A menu item, namely, the "3" menu item is controlled to belong to a moved menu item, the portable terminal 100 may display indicating that the "3" menu item is arranged on the same layer together with other menu items.

As illustrated previously, the portable terminal 100 of the present invention may easily move a menu item to another page through a touch down event and tilt operation. In the foregoing embodiment, the "3" menu item in a screen 1303 may be moved to another region of the same menu page according to generation of a drag event by the user. Although a menu page was described by way of example in the foregoing embodiment, the menu item may become a widget item or an item for operating a certain user function.

Meanwhile, the foregoing embodiment has illustrated that a configuration output on an unoccupied area of a display unit based on multiple inputs are menu icons. However, the present invention is not limited thereto. That is, items output on the unoccupied area of the display unit based on multiple inputs may become user function items according to a multi-tacking function currently performed by the portable terminal. Accordingly, icons output on the unoccupied area of the display unit may be icons corresponding to user function items according to the multi-tacking function. As a result, the number and a type of icon output on a blank of the display unit may be changed according to a type and a form of a performed user function.

As illustrated earlier, an operation of a terminal based on multiple inputs according to the present invention changes a primary screen, that is, controls the size of an image being output on a display panel 141 when generating a touch-down event having two touched points 2P1 and 2P2 and perform an icon output function being an additional function based on continuous multiple inputs of the touch-down event and the sensor signal.

As apparent from the above description, an operating method of a portable terminal based on multiple inputs and a portable terminal supporting the same according to an embodiment of the present invention may generate distinct commands according to the number of touched points of a touch-down event and a type and a form of a sensor signal, and operate respective user functions according the generated distinct commands. The present invention may generate distinct "multiple-input" commands according to a type of a currently activated user function even in the case of the same touch-down event and sensor signal to rapidly and conveniently generate an input signal.

The foregoing mobile terminal 100 may further include various additional modules according to provision forms. That is, when the mobile terminal 100 is a communication terminal, it may include constructions that are not mentioned such as a camera module for photographing still images/moving images of a subject, an interface exchanging data in a wired communication scheme or a wireless communication scheme of the mobile terminal 100, an Internet communication module communicating with an Internet to perform an Internet function, and a digital broadcasting module receiving and broadcasting digital broadcastings. Since the structural elements can be variously changed according to convergence trend of digital devices, all elements need not be listed to express the operations of the invention claims. However, the portable terminal 100 may include structural elements equivalent to the foregoing structural elements. Further, the terminal 100 of the present invention may be substituted by specific constructions in the foregoing arrangements according to the provided form or another structure. This can be easily understood to those skilled in the present art.

Further, the portable terminal 100 according to an embodiment of the present invention may include various types of device having a communication module capable of performing data communication. For example, the portable terminal 100 may include an information communication device and a multimedia device such as a Portable Multimedia Player (PMP), a digital broadcasting player, a Personal Digital Assistant (PDA), a music player (e.g., MP3 player), a portable game terminal, a Smart Phone, a notebook computer, and a handheld PC as well as various mobile communication terminals corresponding to various communication systems.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A portable terminal comprising:
   a touch screen; and
   a processor to:
   display a first menu page on the touch screen;
   detect a touch event on a region of the first menu page on which a menu item is displayed;
   detect a tilt of the portable terminal while the touch event is maintained;
   in response to the tilt, change the display of the touch screen from the first menu page to a second menu page in a state of displaying of the menu item;
   detect a touch release event corresponding to a user releasing the touch from the touch screen while the touch screen displays the second menu page; and
   in response to detecting the touch release event, associate the menu item with the second menu page.

2. The portable terminal of claim 1, wherein the menu item is an icon.

3. The portable terminal of claim 1, wherein the menu item corresponds to an application program executable by the portable terminal.

4. The portable terminal of claim 1, wherein the first menu page to display a plurality of menu items that includes the menu item on which the touch event is detected.

5. The portable terminal of claim 1, wherein the second menu page to display a plurality of menu items.

6. The portable terminal of claim 1, wherein to display the menu item on the second menu page the processor o display the menu item at a predetermined location on the second menu page.

7. A method comprising:
   displaying a first menu page on a touch screen of a portable terminal;
   detecting a touch event on a region of the first menu page on which a menu item is displayed;
   detecting a tilt of the portable terminal while the touch event is maintained;
   in response to the tilt, changing the display of the touch screen from the first menu page to a second menu page in a state of displaying of the menu item;
   detecting a touch release event corresponding to a user releasing the touch from the touch screen while the touch screen displays the second menu page; and
   in response to detecting the touch release event, associating the menu item with the second menu page.

8. The method of claim 7, wherein the menu item is an icon.

9. The method of claim 7, wherein the menu item corresponds to an application program executable by the portable terminal.

10. The method of claim 7, further comprising displaying a plurality of menu items on the first menu page that includes the menu item on which the touch event is detected.

11. The method of claim 7, further comprising displaying a plurality of menu items on the second menu page.

12. The method of claim 7, wherein displaying the menu item on the second menu page comprises displaying the menu item at a predetermined location on the second menu page.

* * * * *

UNITED STATES PATENT AND TRADEMARK OFFICE
CERTIFICATE OF CORRECTION

| | | |
|---|---|---|
| PATENT NO. | : 9,001,056 B2 | Page 1 of 1 |
| APPLICATION NO. | : 13/315435 | |
| DATED | : April 7, 2015 | |
| INVENTOR(S) | : Kyung Hwa Kim et al. | |

It is certified that error appears in the above-identified patent and that said Letters Patent is hereby corrected as shown below:

In the claims,

Column 19, Claim 1, Line 36 should read as follows:
--...a processor configured to...--

Column 19, Claim 1, Line 40 should read as follows:
--...detect a tilting of...--

Column 19, Claim 1, Line 42 should read as follows:
--...response to the tilting...--

Column 20, Claim 6, Line 14 should read as follows:
--...the processor to display...--

Column 20, Claim 7, Line 22 should read as follows:
--...detecting a tilting of...--

Column 20, Claim 7, Line 24 should read as follows:
--...response to the tilting...--

Signed and Sealed this
Twenty-first Day of July, 2015

Michelle K. Lee
*Director of the United States Patent and Trademark Office*